Figure 1:
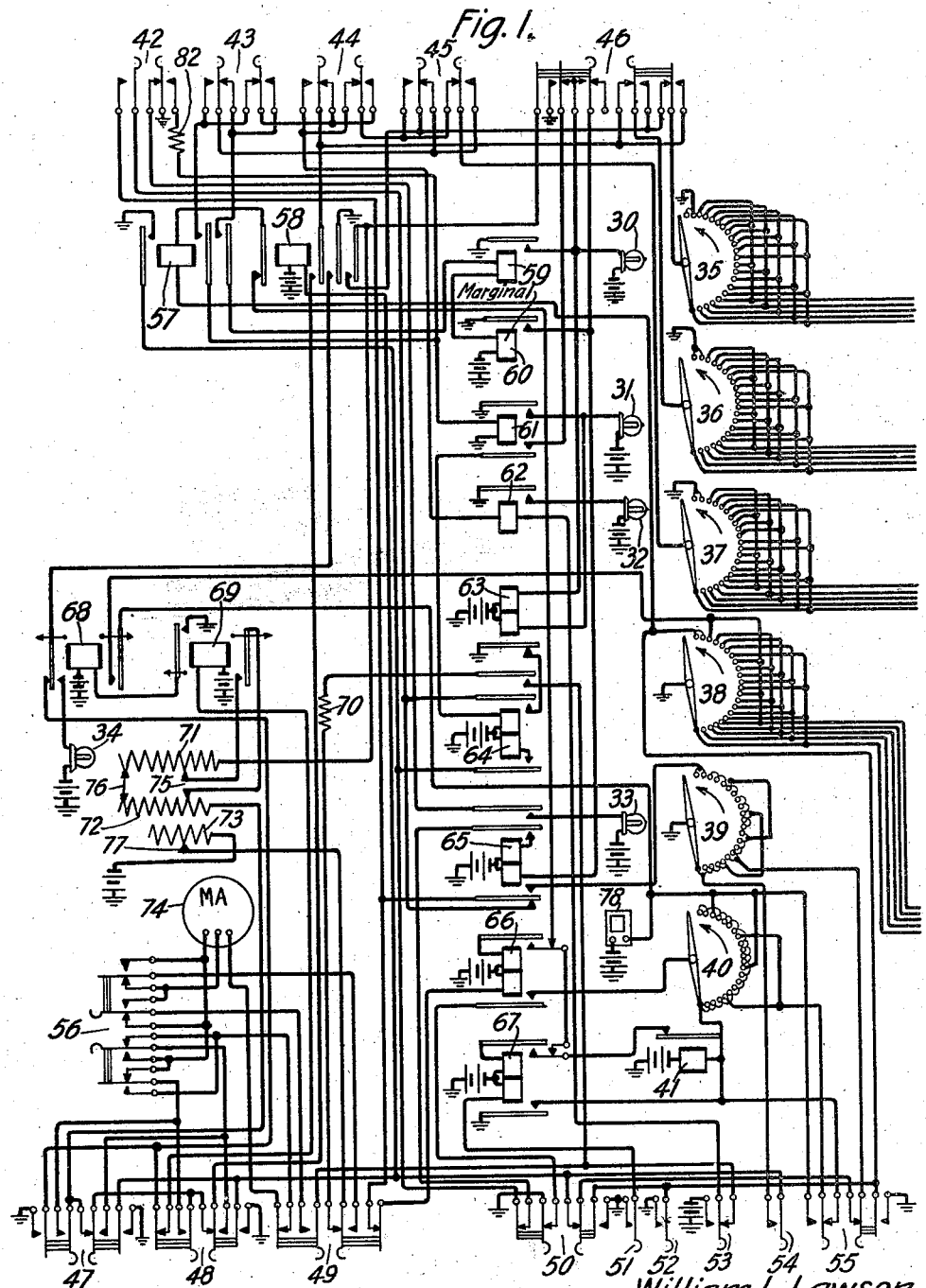

Feb. 15, 1927.

W. L. LAWSON ET AL 1,617,336

TESTING SYSTEM

Filed Jan. 16, 1926 2 Sheets-Sheet 1

Inventors: William L. Lawson.
Myron E. Canfield.
by ~~~~ Att'y.

Feb. 15, 1927.

W. L. LAWSON ET AL 1,617,336

TESTING SYSTEM

Filed Jan. 16, 1926  2 Sheets-Sheet 2

Inventors. William L. Lawson.
Myron E. Canfield.
by _____ Att'y.

Patented Feb. 15, 1927.

1,617,336

UNITED STATES PATENT OFFICE.

WILLIAM L. LAWSON, OF OAK PARK, ILLINOIS, AND MYRON E. CANFIELD, OF FLUSHING, NEW YORK, ASSIGNORS TO WESTERN ELECTRIC COMPANY, INCORPORATED, OF NEW YORK, N. Y., A CORPORATION OF NEW YORK.

TESTING SYSTEM.

Application filed January 16, 1926. Serial No. 81,666.

This invention relates to testing systems and more particularly to an improved arrangement for testing operating characteristics of ordinary answering jack circuits and the associated line and cut off relays.

An object of the invention is to combine in a single inexpensive test set a greatly simplified circuit arrangement for performing operating tests of a plurality of answering jack circuits and the corresponding line and cut-off relays and for observing and analyzing various unstandard conditions that may arise in these apparatus without shifting the test set from one jack circuit to another.

A feature of this invention is the provision of means whereby continuity tests of the tip, ring and sleeve conductors of a plurality of answering jack circuits to their respective line and cut-off relays may be automatically performed in succession.

Another feature of the invention is the provision of means whereby a signal is given after the continuity test of the individual conductors of each answering jack is completed to indicate that the corresponding circuit is in a standard condition.

Another feature of the invention is the provision of a manually operated key to start the functioning of the automatic continuity tests and after the test set has been associated with a plurality of answering jack circuits.

Another feature of the invention is the provision of means whereby the operating characteristics of the cut off relays are checked during the continuity tests of the corresponding jack circuits.

Another feature of the invention is the provision of means whereby in a system for testing the continuity of a plurality of jack circuits and the associated relays the continuity tests of any particular jack circuit may be repeated and whereby under these circumstances the advance of the testing of succeeding circuits is prevented.

Another feature is the provision of means whereby signals are provided to indicate the particular jack circuit under test.

Another feature is the provision of means whereby the reversal or any other unstandard conditions of the conductors in any jack circuit may be detected and whereby under these circumstances the advance of the test of succeeding circuits is prevented.

Another feature is the provision of means whereby in a system for testing the continuity of a plurality of jack circuits, the continuity tests of any particular jack circuit may be made to the exclusion of others.

Figure 2:
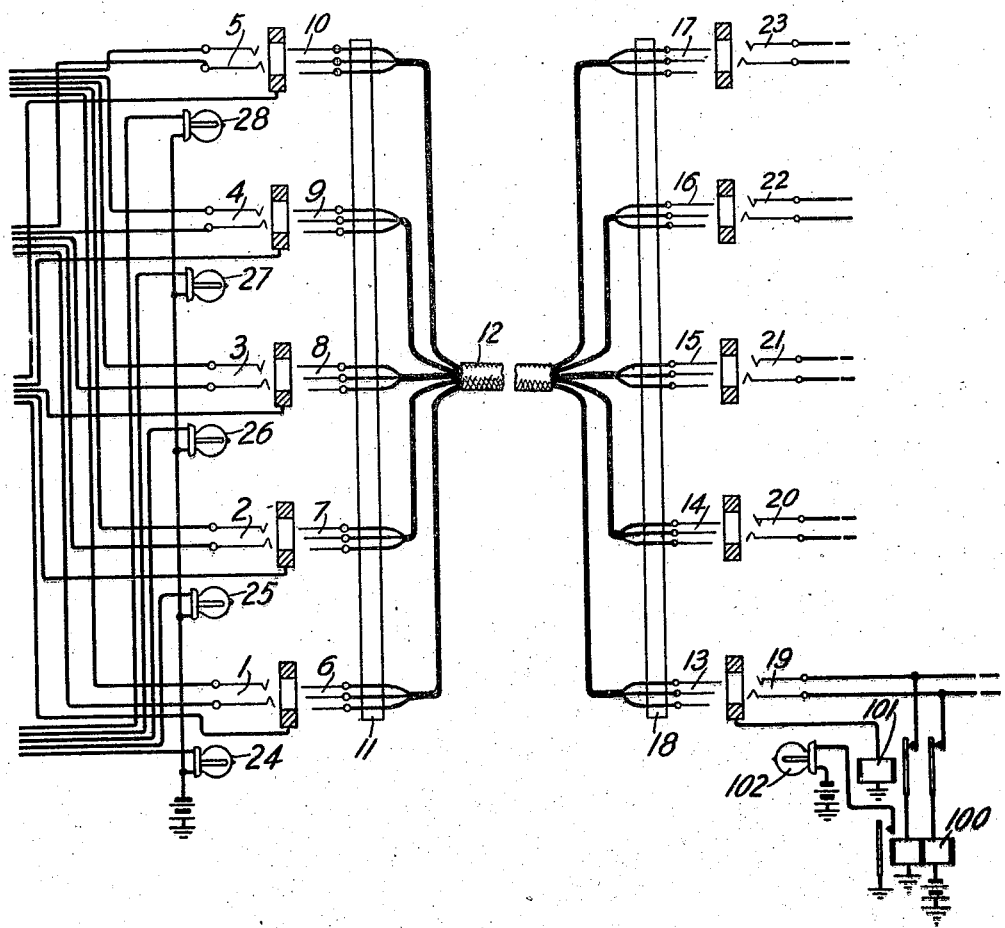

This invention will be described with the aid of the accompanying drawings in which Fig. 1 illustrates a circuit for a test set arranged in accordance with this invention, and Fig. 2 illustrates a plurality of answering jacks to be tested and a multi-contact cord for connecting the test set with said answering jacks.

Referring now to the drawings a test set is illustrated therein arranged for the testing of five answering jack circuits at one time, without shifting the manual connections between the set and the five answering jacks. To this end the set is provided with five jacks 1 to 5 into which the individual plugs 6 to 10 arranged in a single holder 11 may be respectively and simultaneously inserted. The conductors of these plugs 6 to 10 may be arranged in a single cord 12 and may terminate at the opposite end in corresponding plugs 13 to 17 arranged in a single holder 18. The plugs 13 to 17 are therefore similarly adapted to be inserted simultaneously into five answering jacks to be tested such as jacks 19 to 23. The circuit for jack 19 and its associated line and cut off relays have been shown in detail. Associated with jacks 1 to 5, are signal lamps 24 to 28 which are arranged with a plurality of other signal lamps such as 30 to 34 in the test set to variously indicate the progress and outcome of the different tests performed by the set as will hereinafter be described. To automatically advance the testing from one answering jack circuit to another there is provided a series of automatically operating rotary switches 35 to 40 which may be actuated by the stepping magnet 41 to advance the brush contact thereof one step at the time to establish connection with one set of terminals after another. To start the test set operations and to manipulate it to perform a number of different tests, a series of manually operated keys are provided. These keys are numbered 42 to 56. Other circuit connections during the testing operations are performed by a plurality of relays, such as 57 to 69. A resistance 70 and three adjustable resistances 71 to 73 and a milliammeter 74 are other apparatus provided in this set for checking the electrical characteristics of the circuits to be tested as will hereinafter be described.

To bring out the various features of the invention as embodied in this test set, a description will now be made of the various tests that may be performed thereby. These tests may be described as operating and adjustment tests of the cut-off and line relays of five answering jack circuits and may be divided into three groups. The first is the operation or continuity tests of the answering jack conductors and the second is the adjustment tests of the cut-off relays while the third is the adjustment tests of the line relays; the last two tests relating to the checking and measuring the operating characteristics of cut-off and line relays.

To enable the test set to perform these tests, jacks 1 to 5 are connected through to jacks 19 to 23, respectively, by means of the cord 12, and to start the continuity tests key 52 is operated. The operation of this key closes a circuit for relay 57 as follows: battery, winding of stepping magnet 41, armature and back contact of this stepping magnet, normal make-before-break contacts of relays 67 and 66, left-hand armature and back contact of relay 58, winding of relay 57, contacts of key 52 to ground. Relay 57 operates in this circuit and closes circuits through from the line relay 100 associated with jack 19 as follows: one circuit from ground, left-hand winding of line relay 100, inner right armature and back contact of cut-off relay 101, tip terminals of jack 19, plug 13, plug 6, jack 1, to the corresponding terminal and the brush of switch 35, a closed pair of contacts of keys 46, 45 and 43, outer right-hand armature and front contact of relay 57, windings of relays 59 and 60 in series to batteries. Another circuit from battery, right-hand winding of line relay 100, ring contact of jack 19, plug 13, plug 6, jack 1, corresponding terminal and the brush of switch 36, a closed pair of contacts of keys 46, 44 and 43, inner right-hand armature and front contact of relay 57, winding of relay 61 to ground. If the line relay 100 is in a standard condition, relay 59 operates in the first traced circuit but relay 60 does not operate as it is marginal and does not respond if the characteristics of this circuit are normal. The operation of relay 59 closes an obvious circuit for lighting of signal lamp 30, which thus indicates that a circuit of standard character is closed through the line relay 100 and the tip conductor of the circuits for answering jack 19. The operation of relay 59 also closes an obvious circuit through the upper winding of relay 63 causing the operation of this relay. The operation of relay 59 also closes partly a circuit for the upper winding of relay 64 in that a ground is applied from the armature and front contact of relay 59 through a closed pair of contacts of relay 46, to the lower armature and front contact of relay 61. The second mentioned circuit through the line relay 100 causes the operation of relay 61. Relay 61 in operating closes an obvious circuit for lighting of signal lamp 31, which thus indicates that a circuit of standard character is closed through the other winding of line relay 100 and the ring conductor of the circuit for answering jack 19. An obvious circuit is also closed by the operation of relay 61 through the lower winding of relay 63. The operation of relay 61 completes through its lower armature and front contact the previously partially traced circuit for the upper winding of relay 64 so that a circuit is now completed from battery, upper winding of relay 64, through to the ground at the armature and front contact of relay 59 so that when these two relays 59 and 61 operate, relays 63 and 64 are operated. The relay 64 in operating provides a locking-circuit for itself through its lower winding, armature and front contact to ground at the left-hand armature and front contact of relay 57. This relay 64 also closes partially a circuit for relay 66 at its upper inner armature and front contact, the purpose of which will be hereinafter described. Relay 64 also at its upper outer armature and front contact closes a circuit for the operation of the cut off relay 101 of the circuit of jack 19 and for the operation of relay 62 over a circuit as follows: battery, through adjustable resistance 73, a pair of closed contacts or key 49, resistance 70, upper outer armature and front contact of relay 64, closed contact of key 53, winding of relay 62, a closed pair of contacts of keys 44 and 45, the brush and the corresponding terminal of switch 37, sleeve conductor of jack 1, sleeve terminals of jack 1, plug 6, plug 13, jack 19, winding of cut-off relay 101 to ground. This circuit causes the operation of relays 62 and 101. The operation of relay 62 closes an obvious circuit for the lighting of signal lamp 32 which indicates that a circuit of standard character is closed through the cut-off relay 101 and the conductor of the circuits for answering jack 19. It should be noted that a tester may observe the lighting of lamp 102 associated with the circuits of jack 19 on the operation of the line relay 100 and the extinguishing of this lamp on the operation of cut-off relay 101. The continuity tests of the circuits for answering jack 19 are now completed and the continuity tests of the circuits for the next answering jack in the case, namely jack 20, may be made.

It should be noted that on the operation of the cut off relay 101, the circuits for the operation of the line relay 100 and the relays 59 and 61 are open at the right hand armatures and back contacts of the cut-off relay 101. This causes the release of line relay 100 and relays 59 and 61 and the release of these last two relays causes the release of relay 63. The release of relay 63 now closes a circuit for the advancement of the selector brushes to the tip, ring and sleeve terminals for the tip, ring and sleeve conductors of the second circuit, that is, the circuit for performing the continuity tests of the circuits for jack 20. The circuits for this advance of the selectors may be traced as follows: the first circuit is closed due to the release of relay 63 and is as follows: battery lower winding of relay 66, a pair of closed contacts of key 49, lower armature and back contact of relay 65, upper inner armature and front contact of relay 64, armature and back contact of relay 63 to ground. This circuit causes the operation of relay 66. The operation of relay 66 opens the energizing circuit for relay 57 at its make-before-break contacts. On the release of relay 57, relay 64 is released which opens the original energizing circuit for relay 66. Relay 66 is, however, maintained operated through its upper winding, upper armature and front contact, make-before-break contact of relay 67, armature and back contact of stepping magnet 41, brush of switch 40, lower armature and front contact of relay 66, a pair of closed contacts of key 50 to ground. The operation of relay 66 thus provides through the closing of its lower armature and front contact, a circuit for the operation of stepping magnet 41 as follows: battery, winding of stepping magnet 41, the first terminal and brush of switch 40, lower armature and front contact of relay 66, a pair of closed contacts of key 50 to ground. The stepping magnet 41 operates in this circuit and moves the brushes of the switches 35 to 40 one step. As the brush of switch 40 moves from the first terminal the selector magnet 41 and relay 66 are released. When this magnet and relay are released the original energizing circuit for relay 57 is again closed through the make-before-break contact of relay 66 and through the armature and back contact of stepping magnet 40 as hereinbefore described. The continuity tests of the circuits for jack 20 may now therefore begin through the operation of relay 57 and the tip and ring connections for the line relay associated with jack 20 are closed to operate relays 59 and 60 and the operation of the line relay associated with jack 20, followed by the operation of relays 63 and 64 and the operation of the cut-off relay of the circuits for jack 20 and the operation of relay 62.

The operation of the cut off relay causes, as before stated, the release of relay 63 followed by the operation of relay 66 and the advance of the selector switches 35 to 40 to the conductors of the circuits for jack 21. In this manner the continuity test of the circuits for succeeding answering jacks 21, 22 and 23 are provided for and performed in succession. As these tests are performed it will be noted that lamps 24 to 28 are lighted in succession to indicate the particular answering jack under test at any time. This is accomplished through the brush and corresponding terminals of switch 38, that is, for example, when jack 19 is tested, a circuit will be completed for lamp 24; to battery, lamp 24 through the first terminal and the brush of switch 38 to ground, and correspondingly circuits will be closed in succession by lamps 25 to 28 as jacks 20 to 23 are tested.

If it is desired to make the above continuity tests only, the key 55 should be operated simultaneously with the operation of key 52 at the beginning of the tests. If this is the case, the buzzer 78 will operate at the completion of the continuity tests for the circuits of the test jack in the group, namely jack 23, in the following manner: When the switch has finished the testing of the circuits of jack 23, the brushes of the switches 35 to 40 will be located on the fifth terminal. In this position a circuit will now be closed for buzzer 78 as follows: battery, winding of buzzer 78, left-hand closed contacts of key 55, the fifth terminal of switch 40 and its corresponding brush, lower armature and front contact of relay 66, a pair of closed contacts of key 50 to ground.

The operator hearing the sound from the buzzer 78 will then remove the plugs 13 to 17 from jacks 19 to 23 and insert these plugs in another set of five answering jacks whereupon the continuity test of the circuits for these jacks may proceed. To open the circuit for the buzzer and advance the selector switches first to the sixth terminal position and later through the seventh to the eleventh terminal position in readiness to the testing of this second set of answering jacks, key 51 will now be operated. The operation of this key closes an obvious energizing circuit for relay 67 which in operating closes at its lower armature and front contact an obvious energizing circuit to stepping magnet 41 and relay 67 provides for itself an obvious locking circuit through the armature and back contact of magnet 41 to insure the operation of magnet 41. On the operation of relay 67 relay 66 releases and opens the buzzer circuit and on the operation of magnet 41 the brushes of the switches 35 to 40 are advanced to the sixth terminal position. If the key 51 is now operated five times in succession the relay 67 and consequently, magnet 41 will operate the corresponding number of times to advance the selector switches until their brushes come to rest in their eleventh terminal position. It will be noted that in this position lamp 24 will become lighted so that the tester will now know that the continuity test of another set of five answering jacks may begin. By virtue of the plugs 13 to 17 of the cord 12 being inserted in said second group of answering jacks and the switches being advanced to the eleventh terminal position, the testing of the circuit for the first of these jacks will begin as relay 57 was reoperated on the release of relay 67 and the release of magnet 41 and the circuits from the tip and ring conductors of this first jack will be completed through to the relays 59 to 61 as hereinbefore described. In this manner, two successive sets of five jacks each may be tested for continuity by shifting the plugs 13 to 17 each time the buzzer 78 is heard from one set of five answering jacks to another and the key 51 has been operated the required number of times between each test of five answering jacks each to advance the selector switches 35 to 40 past terminals 6 to 10 and 16 to 20. These terminals 6 to 10 and 16 to 20 are normally reserved for the adjustment tests of the line relays associated with these two sets of answering jack circuits. Such adjustment tests will presently be described.

When the selector switches 35 to 40 come to the 20th terminal positions as will be the case after two sets of answering jacks have been tested for continuity of jack circuits or when both continuity and adjustment tests have been made as will be hereinafter described, the operation of key 51 will advance the selector brushes to the 21st position in a manner as hereinbefore described and when this position is reached the selectors are automatically returned to the normal position shown in the drawing. This is accomplished as follows: In the 21st position a circuit is closed for the operation of relay 57 so that the tip and ring conductors of the test set are connected up from the brushes of switches 35 and 36 to the relays 59 and 60 and 61. Ground on the brush of switch 35 from terminal 21 causes the operation of relays 59 and 60 and the operation of relay 60 closes an obvious circuit for relay 65. Relay 65 in operating provides a locking circuit for itself to ground at the left-hand armature and front contact of relay 57. This relay 65 also closes a circuit for the operation of relay 66 as follows: battery, lower winding of relay 66, a pair of closed contacts of key 49, lower armature and front contact of relay 65, terminal 21 of the brush switch 39 to ground. Relay 66 in operating causes the advance of the selector switches 35 to 40 to the 22nd position by closing the circuit for magnet 41 to its lower armature and front contact and terminal 21 of switch 41 as the switches move from position 21 to position 22 all of these relays are released and when the 22nd position is reached the above operations are repeated and the switches thereby returned to normal position.

It will be noted that during these continuity tests described above, the so-called adjustment tests of the cut-off relays are automatically performed, that is, the circuits for the cut-off relays completed through relay 62 are also extended through the adjustable resistance 22 which may be set to provide the proper electrical characteristics of the test circuit. If any particular cut-off relay does not operate during these tests to extinguish the line lamp of the associated answering jack circuit such failure may be due to the faulty adjustment of the cut-off relay or to some unstandard condition in the circuit therefor in the particular answering jack circuit under test. To ascertain the source of such failure in the operation of the cut-off relay key 53 may be operated. By operating this key, a so-called soak value of current may be placed through the cut-off relay winding by the opening of the circuit for this relay through the adjustable resistance 22 and the resistance 70 and the closing of a connection directly from a winding of the relay 62 to battery at the now closed contacts of key 53. If this particular cut-off relay now operates it would indicate that the electrical characteristics of the winding of this particular cut-off relay were at fault. If relay 62 does not operate some unstandard condition exists in the sleeve conductor leading to this cut-off relay.

If it is desired to perform adjustment tests of the line relays of a particular group of five answering jacks connected for test immediately after the continuity tests of the circuits therefor and the adjustment tests of the cut-off relays have been performed, the key 55 is not operated with key 52 at the beginning of the tests but allowed to remain in a normal position. It will be noted that at the completion of the tests of the five answering jacks and while the brushes of the switches 35 to 40 are in their fifth position, a circuit will be closed to prepare the set for adjustment tests of the line relays. A circuit for starting these operations will be closed as follows: When the brush of switch 40 alights on the fifth terminal, a circuit will be completed for stepping magnet 41 as follows: battery, winding of stepping magnet 41, a normally closed pair of contacts of key 55, fifth terminal and brush of switch 40, lower armature and front contact of relay 66, a closed pair of contacts of key 50 to ground. The stepping magnet will now take one additional step and cause the brushes of switches 35 to 40 to contact with their sixth terminals. At the operation of stepping magnet 41, the holding circuit for relay 66 will be open at the armature and back contact of this magnet thus allowing relay 66 to release and the original energizing circuit for relay 57 is again closed at the normal contacts of the relay 66. In this position, the circuit for the two windings of the line relay 100 will be completed to the relays 59 and 60 and 61 but it will be noted, that these circuits will be immediately opened and other circuits completed due to the operation of relay 58 under these circumstances which takes place over a circuit as follows: battery, winding of relay 58, a pair of closed contacts of key 50, a pair of closed contacts of key 55, the sixth terminal of switch 39 and the corresponding brush to ground. The operation of relay 58 opens the energizing circuit for relay 57 which in releasing opens the tip and ring conductors from the line relay 100 to the relays 59 and 60 and 61 and relay 58 closes a loop circuit from the windings of line relay 100 through the adjustable resistances 71 and 72 as follows: battery, right-hand winding of line relay 100, outer right-hand armature and back contact of cut-off relay 101, tip terminals of jack 19, plug 13, plug 6, jack 1, sixth terminal of switch 35 and the corresponding brush, a pair of closed contacts of key 46, outer right-hand armature and front contact of relay 58, adjustable resistance 71, right-hand armature and front contact of relay 69, adjustable resistance 71, a pair of closed contacts of keys 47 and 48, inner right-hand armature and front contact of relay 58, a pair of closed contacts of key 46, the brush of switch 36 and its sixth terminal to the tip and ring terminals of jack 1, plug 6, plug 13, jack 19, right-hand inner armature and back contact of relay 101, left-hand winding of relay 100 to ground. However, it should be noted that this circuit is not completed until relay 69 is operated which takes place immediately upon the operation of relay 58. The circuit for the operation of relay 69 is as follows: battery, winding of relay 69, a closed pair of contacts of key 48, left-hand armature and back contact of relay 68, middle right-hand armature and front contact of relay 58 to ground. The resistances 71 and 72 are adjusted to cause the proper electrical condition to prevail on the tip and ring conductors for the operation of line relay 100 and to determine whether or not line relay 100 is functioning properly, these circuits through the resistances 71 and 72 will be alternately opened and closed to cause the alternate lighting and extinguishing of lamp 102 in the circuits for jack 19 and of lamp 34 in the test set. The circuits for this purpose are as follows: It will be noted that on the operation of relay 69 an obvious circuit is closed for the operation of relay 68 which in operating opens the energizing circuit for relay 69 so that when this relay releases, the relay 68 releases and again closes the circuit for the operation of relay 69. As these relays 68 and 69 are slow to release, a circuit for line relay 100 will be alternately opened and closed at a definite rate and consequently lamp 102 and lamp 34 are alternately lighted and extinguished to indicate the operation and release of the line relay. By the proper adjustments of the resistances 71 and 72 therefore, the operating and release values of the line relay 100 will be tested. By arranging the adjustment tests of the line relays so that the line lamps are alternately lighted and extinguished a distinction is made between these tests and the continuity tests.

It should be noted that due to the fact that the relay 66 is not operated in this circuit, the selector switches 35 to 40 will not advance for the adjustment tests of the succeeding jacks in the group of jacks connected to the test set but that the selector may be advanced for the testing of these succeeding jack circuits by the manual operation of key 51. The operation of this key closed an obvious circuit for the operation of relay 67. The operation of this relay closed an obvious circuit for the magnet 41 to advance the selectors to connect the set with the circuits of the next answering jack, in this case jack 20. When now, therefore, the brushes of these switches are advanced to the seventh terminal, the circuit for relay 58 will be again closed as previously traced except that the ground will now be supplied through from the brush of switch 39 at its seventh terminal. In a similar manner the line relays of the succeeding answering jacks are tested, that is, each time key 51 is operated, the brushes of the selector switches 35 to 40 will advance the connections to a succeeding answering jack. When the fifth answering jack has been tested, a circuit will be closed for the operation of the buzzer 78 as follows: battery, winding of the buzzer 78, right-hand armature and front contact of relay 68, tenth terminal of switch 38 and its corresponding brush to ground to indicate that the adjustment test of the line relay of the five answering jack circuits has been completed.

If it is desired to test the actual operating value of a line relay, that is, in case a line relay does not operate on the proper adjustment of resistances 71 and 72, the pointers 75 may be moved toward the right until a connected line relay does operate. To permit this to be done, a key 47 will be operated. When this key is operated a circuit is closed for the operation of relay 58 as follows: battery, winding of relay 58, outer right-hand closed contact of key 47 to ground. The operation of relay 58 closes the test circuit from a line relay through the resistances 71 and 72 as hereinbefore described and a circuit is also therefore closed for the operation of relay 69 as follows: battery, winding of relay 69, a pair of closed contacts of key 48, outer left-hand pair of closed contacts of key 47 to ground. The circuit for the line relay to be thus tested is also closed through the operation of key 47 to the milliammeter 74 as follows: from resistance 72, left-hand inner closed contacts of key 47, a pair of closed contacts of key 56 through the milliammeter 73, a pair of closed contacts of key 49, a pair of closed contacts of key 56, inner right-hand closed contacts of key 47, a pair of closed pair of contacts of key 48, inner right-hand armature and front contacts of relay 58 so that when the slider 75 is moved toward the right and the line relay under test operates, the exact value of the current passing through this relay is registered on the milliammeter 74 that is, the actual operating value of any line relay under test may be measured in this manner.

Similarly, if it is desired to test the actual release value of any particular line relay, the key 48 may be operated. In this case relay 58 will be operated through an obvious circuit through the closed outer right-hand contacts of key 48 and relay 69 will be prevented from operating through the opening of the outer left-hand contact of key 48 so that the loop circuit will be open through slider 75 but closed through the slider 76 which may now be moved to the left until the particular line relay under test releases. It should also be noted that the operation of key 48 closes this loop circuit for the line relay through the milliammeter 74 to measure the actual value of the current at the time the line relay releases. The circuit of this loop to the milliammeter 74 may be traced as follows: resistance 72, a pair of closed contacts of key 47, inner left-hand closed contacts of key 48, a pair of closed contacts of key 56, through the milliammeter 74, a pair of closed contacts of key 49, a pair of closed contacts of key 56, inner right-hand closed contacts of key 48 to the inner right armature and front contact of relay 58.

If it is desired to measure the actual operating value of any particular cut-off relay, key 49 may be operated. In this case, the circuit from the cut-off relay will not go through resistance 70 but may be traced from the battery, through the adjustable resistance 73, right-hand inner closed contacts of key 49, a pair of closed contacts of key 56 through the milliammeter 74, a pair of closed contacts of key 56, inner left-hand closed contacts of key 49, the closed contacts of key 53, winding of relay 62 and out through the winding of the particular cut-off relay under test as hereinbefore traced to ground. The slider 76 may now be moved across the resistance 73 until the cut off relay connected in this circuit operates and the operating value of the current flowing in the circuit may be noted on the milliammeter 74.

The purpose of the key 56 in the circuits above mentioned to the milliammeter 74 is for the purpose of reversing the current flow through the meter in case the connections from the battery at the jack circuits are poled in the opposite direction from the usual connections, a condition that the tester will be aware of when conducting tests in different types of switchboard as is well known in the art.

If during the continuity tests of a group of answering jack circuits, it is found that a particular jack circuit does not function properly, the tests of any one of these circuits may be repeated by operating key 50 at the time the unstandard condition is observed. The operation of key 50 closes an obvious circuit for the operation of relay 57. This relay in operating completes a circuit for the particular jack circuit under test through to the relays 59 and 60 and 61 and the operation of the test circuits is repeated in the same manner except for the circuit for the advance of the selector switches normally completed through the lower armature and front contact of relay 66 and that is in this case opened at the outer left-hand contacts of key 50. When therefore relay 66 operates on the release of relay 63, the selector switches are not advanced. Relay 57, however, is released as under normal conditions on the operation of relay 66 causing the release of relay 64 which in turn causes the release of relay 66 to again complete the circuit for relay 57. In this manner the test for the particular jack circuit on which an unstandard condition has been observed is repeated time and again until key 50 is released at which time the tests of the succeeding jack circuits may proceed, in the usual manner.

The unstandard conditions above referred to that may occur during the continuity testing of jack circuits and adjusting tests of cut-off and line relays may be due to various causes. For example, the electrical conditions on the tip conductor of a jack circuit may be such as to cause the marginal relay 60 to operate in series with relay 59. The marginal characteristics of relay 60 may be such as to prevent its operation on currents through the tip conductor circuits below a certain predetermined value. This value may be the maximum allowable for tip conductor circuits through line relays and in this manner whenever relay 60 does operate it will be known that the current through the particular tip conductor through the line relay under test is excessive. If relay 60 operates, an obvious circuit is closed for the operation of relay 65 which in turn closes an obvious circuit for the lighting of lamp 63 to indicate this unstandard condition. Relay 65 locks to relay 57. It should be noted that under these circumstances the switches will not advance at the completion of the test of this particular jack circuit as relay 65 in operating will prevent the operation of relay 66 on the release of relay 63.

Other unstandard conditions may be that relays 59 and 61 fail to operate altogether or fail to release when the cut-off relay of the jack circuit under test operates. In these cases the circuit for the operation of relay 66 will not be completed so that the selector switches will not advance and the signal lamps 30, 31, and 32 will then indicate the exact condition or cause of failure of the jack circuit under test. For example, if lamps 30 and 31 fail to light, this will indicate that either the tip and ring conductors are reversed or that they are open. If lamp 30 is lighted and lamp 31 fails to light, this will indicate that the ring conductor is open. If lamp 30 fails to light and lamp 31 is lighted, this will indicate that the tip conductor is open. To ascertain if the tip and ring conductors are reversed key 43 may be operated and if lamps 30 and 31 then light, it indicates a reversal of these conductors. If lamps 30 and 31 are lighted and lamp 32 fails to light, this will indicate that the sleeve conductor is open. If the lamp 32 and lamps 30 or 31 are lighted, this will indicate that the cut off relay has failed to open the tip or ring conductors. If the key 53 is then operated and lamp 32 and lamps 30 or 31 are lighted, this will indicate that there is a ground on the sleeve conductor or that there is a false ground or battery on the tip conductor or the ring conductor. If the lamp 32 and lamp 33 are lighted, this will indicate that there is a ground between the cut off relay and the line relay on the tip conductor. When the lamps 30, 32 and 33 are lighted, this will indicate that there is a ground between the answering jack itself and the cut-off relay on the tip conductor. If it is thought that the ring and sleeve conductors are reversed key 44 may be operated, and if the test then proceeds in the regular manner, it indicates that the analysis was correct. Similarly if it is thought that the tip and sleeve conductors are reversed the key 45 may be operated and if the test then proceeds in the regular manner, it indicates that the analysis in this respect was correct. It will thus be seen that by these various combinations of signals and by the manipulation of the reversing keys as described above, the exact condition of a particular answering jack circuit under test may be indicated.

If it is desired to test any one of the answering jack circuits to the exclusion of all others, key 51 may be operated a number of times until the selector switches have been advanced to the jack circuit it is desired to test, which will be indicated by the lighting of a particular one of the lamps 24 to 28, corresponding to the jack circuit to be tested. If then the start key 52 is operated, the testing of this circuit may begin and if the key 50 is also operated, the testing of this circuit may be repeated.

What is claimed is:

1. In a system for testing telephone circuits, means comprising a plurality of plug-ending cords for temporarily and simultaneously connecting a testing device to a plurality of telephone circuits, and means for automatically and successively testing such circuits.

2. In a system for testing telephone circuits, means comprising a plurality of plug-ending cords with the plugs at each end assembled in a common handle for temporarily and simultaneously connecting a testing device to a plurality of telephone circuits, and means for automatically and successively testing the circuits.

3. In a system for testing telephone circuits, means for temporarily and simultaneously connecting a testing device to a plurality of telephone circuits, means for automatically and successively testing such circuits, and means for indicating in response to the performance of the tests on each circuit that the corresponding circuit is in standard condition.

4. In a system for testing telephone circuits, means for temporarily and simultaneously connecting a testing device to a plurality of telephone circuits, means for automatically and successively testing such circuits, means for discontinuing the automatic testing of any circuit after the completion of the tests upon any particular circuit, and means for repeating the tests upon this particular circuit.

5. In a system for testing telephone circuits, means for temporarily and simultaneously connecting a testing device to a plurality of telephone circuits, means for automatically and successively testing such circuits, and means for actuating said testing device to perform the automatic tests on any one of said circuits and eliminating the testing of all the other circuits.

6. In a system for testing telephone circuits, means for temporarily and simultaneously connecting a testing device to a plurality of telephone circuits, means for automatically and successively testing such circuits, and signaling devices and keys for detecting the reversal of the conductors of any particular circuit under test.

7. In a system for testing telephone circuits, means for temporarily and simultaneously connecting a testing device to a plurality of telephone circuits, means for automatically and successively testing such circuits, and means for preventing the advance of the automatic testing of succeeding circuits responsive to the failure of the tests upon any one of said circuits.

8. A system of testing the electrical characteristics of jack circuits comprising means for temporarily and simultaneously connecting a testing device to a plurality of such circuits, means for automatically and successively testing such circuits characterized by the provision of means for testing the continuity of the tip, ring and sleeve conductors of said circuits, and by the provision of means for applying another type of test of the sleeve conductor to ascertain the operating characteristics of the corresponding cut-off relay.

In witness whereof, we hereunto subscribe our names this 9th day of January A. D., 1926, and on 14th January 1926.

WILLIAM L. LAWSON.
MYRON E. CANFIELD.